(12) United States Patent
Chinnadurai et al.

(10) Patent No.: US 8,095,259 B2
(45) Date of Patent: *Jan. 10, 2012

(54) FORMULA SERVER FOR DIAGNOSTIC SYSTEMS

(75) Inventors: Manohar Chinnadurai, Owatonna, MN (US); Troy J. Liebl, Owatonna, MN (US)

(73) Assignee: SPX CorporationNC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/050,670

(22) Filed: Mar. 17, 2011

(65) Prior Publication Data

US 2011/0167301 A1    Jul. 7, 2011

Related U.S. Application Data

(63) Continuation of application No. 11/729,837, filed on Mar. 30, 2007, now Pat. No. 7,912,598.

(51) Int. Cl.
*G06F 7/00* (2006.01)
(52) U.S. Cl. ............... 701/29; 701/33; 701/36; 714/25
(58) Field of Classification Search ............ 701/29, 701/33–36; 702/182–185
See application file for complete search history.

(56) References Cited

U.S. PATENT DOCUMENTS 6,028,537 A * 2/2000 Suman et al. ............ 340/988

* cited by examiner

*Primary Examiner* — Yonel Beaulieu
(74) *Attorney, Agent, or Firm* — Baker & Hostetler LLP

(57) ABSTRACT

An apparatus and method are provided and include a formula server having formulas and conversion modules that are separate from a diagnostic application of a diagnostic tool. The diagnostic tool receives the diagnostic data and transmits it to a remote computer, where the data is converted using a formula. The resulting data is then transmitted back to the diagnostic tool for display.

20 Claims, 3 Drawing Sheets

FORMULA SERVER FOR DIAGNOSTIC SYSTEMS

CROSS-REFERENCE TO RELATED APPLICATIONS

This application claims priority to and is a continuation of U.S. patent application Ser. No. 11/729,837, entitled, "Formula Server for Diagnostic Systems," filed Mar. 30, 2007, now U.S. Pat. No. 7,912,598, which is hereby incorporated by reference in its entirety.

FIELD OF THE INVENTION

The present invention relates generally to providing conversion formulas. More particularly, the present invention relates to providing conversion formulas for diagnostic tools.

BACKGROUND OF THE INVENTION

Most modern vehicle are utilizing on board computers to control and monitor engine and electrical system functions. A scan tool can be used to communicate with the engine through a data link connector on the vehicle. The scan tool can retrieve diagnostic information such as trouble codes, and sensor and actuator information from the vehicle on board computers. Some of the diagnostic information has to be converted using a formula stored on a database.

The scan tool software databases are written based on information provided by the various manufacturers. The database can be verified on the vehicles for correct function and accuracy of the diagnostic data. Should the database contain an error, it usually relates to a conversion formula applied to the diagnostic data received from the vehicle. The conversion formula is an integral part of the software's database and requires a rebuild of the software on the scan tool once the error is determined.

In order to update the scan tool, costly updates have to be sent to each single scan tool and the updates have to be uploaded. The updates can be done on-site or the scan tool has to be returned to the manufacturer for updating. Thus, the updates increase the down time of the scan tool and repairs must wait until the tool is returned or updated.

Accordingly, it is desirable to provide the conversion formulas apart from the diagnostic software database and from the diagnostic tool.

SUMMARY OF THE INVENTION

The foregoing needs are met, to a great extent, by the present invention, wherein in one aspect an apparatus is provided that in some embodiments a remote formula computer is provided that allows for data conversion remote from the diagnostic device and its software database.

In accordance with one embodiment of the present invention, a computer that converts data is provided, which can include a processor to process information and operate the computer, a memory of the computer storing a software and communicating with the processor, and a communication interface that allows the computer to communicate with a remote diagnostic device, wherein the software includes a platform abstraction module and a data converter module, the platform abstraction module directs which formula the data converter module uses to convert a data received from the remote diagnostic device based on the platform abstraction module's determination of the data's platform.

In accordance with another embodiment of the present invention, a method of converting data using a computer is provided, which can include the steps of receiving platform specific data from a diagnostic device by a processor of the computer, converting the data with the processor of the computer using a conversion formula from a data converter module, the conversion formula is chosen at the direction of the platform module based on the platform module's determination of the data's platform, and transmitting the converted data to the diagnostic device using a communication interface.

In accordance with yet another embodiment of the present invention, a system for converting diagnostic data in a computer is provided, which can include means for processing information and operating the computer; means for storing a software, the means for storing communicating with the means for processing, and means for communicating with a remote diagnostic device, wherein the software includes a platform abstraction module and a data converter module, the platform abstraction module directs which formula the data converter module uses to convert a data received from the remote diagnostic device based on the platform abstraction module's determination of the data's platform.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
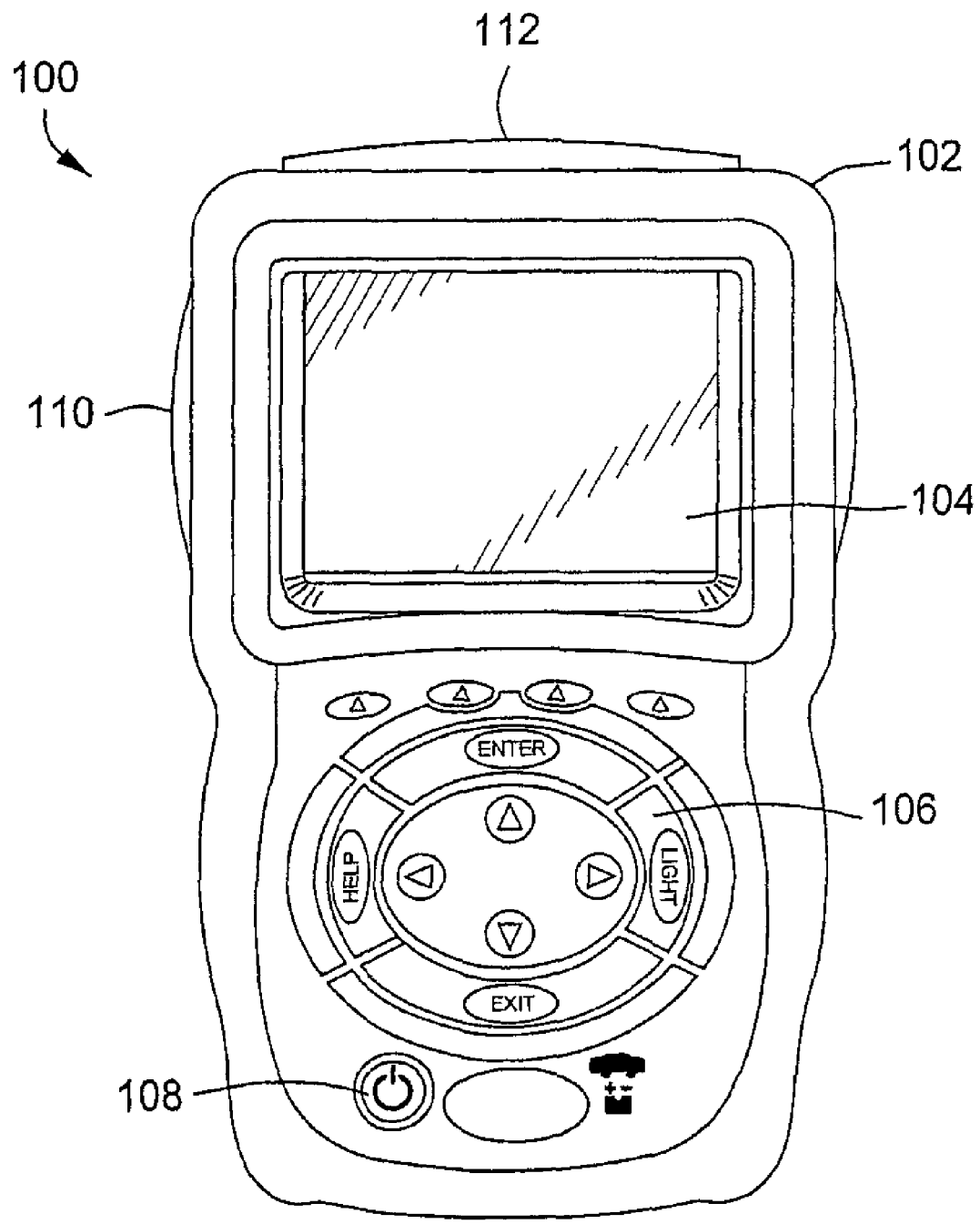
FIG. 1 is a front view of a scan tool that can benefit from the formula according to an embodiment of the invention.

The invention will now be described with reference to the drawing figures, in which like reference numerals refer to like parts throughout. An embodiment in accordance with the present invention provides an apparatus and method that provide formulas, such as conversion formulas apart from the scan tool and its diagnostic software and database.

FIG. 1 is a front view of a scan tool 100 that can benefit from the formula according to an embodiment of the invention. The scan tool 100 can be any computing device, such as, for example, the Nemisys scan tool from Service Solutions (a unit of the SPX Corporation) in Owatonna, Minn. The scan tool 100 includes a housing 102 to house the various components of the scan tool, such as a display 104, a user interface 106, a power key 108, a memory card reader 110 and a connector interface 112. The display 104 can be any display, for example, LCD (liquid crystal display), VGA (video graphics array), touch display (can also be a user interface), etc. The user interface 106 allows the user to interact with the scan tool in order to operate the scan tool as desired. The user interface 106 can include function keys, arrow keys or any other type of keys that can manipulate the scan tool 100 in order to operate various menus that are presented on the display. The user interface 106 can also be a mouse or any other suitable input device, including a keypad. The user interface 106 can also include numbers or be alphanumeric. The power key 108 allows the user to turn the scan tool 100 on and off, as required.

Memory card reader 110 can be a single type card reader, such as a compact flash card, floppy disc, memory stick, secure digital, other types of flash memory or other types of memory. The memory card reader 110 can be a reader that reads more than one of the aforementioned memory such as a combination memory card reader. Additionally, the card reader 110 can also read any other computer readable medium, such as CD, DVD, UMD, etc.

The connector interface 112 allows the scan tool 100 to connect to an external device, such as an ECU (electronic control unit) of a vehicle, a computing device, an external communication device (such as a modem), a network, etc. through a wired or wireless connection. Connector interface 112 can also include a USB, FIREWIRE, modem, RS232, RS48J, and other connections to communicate with external devices, such as a hard drive, USB flash memory device, CD player, DVD player, UMD player or other computer readable medium devices.

Figure 2:
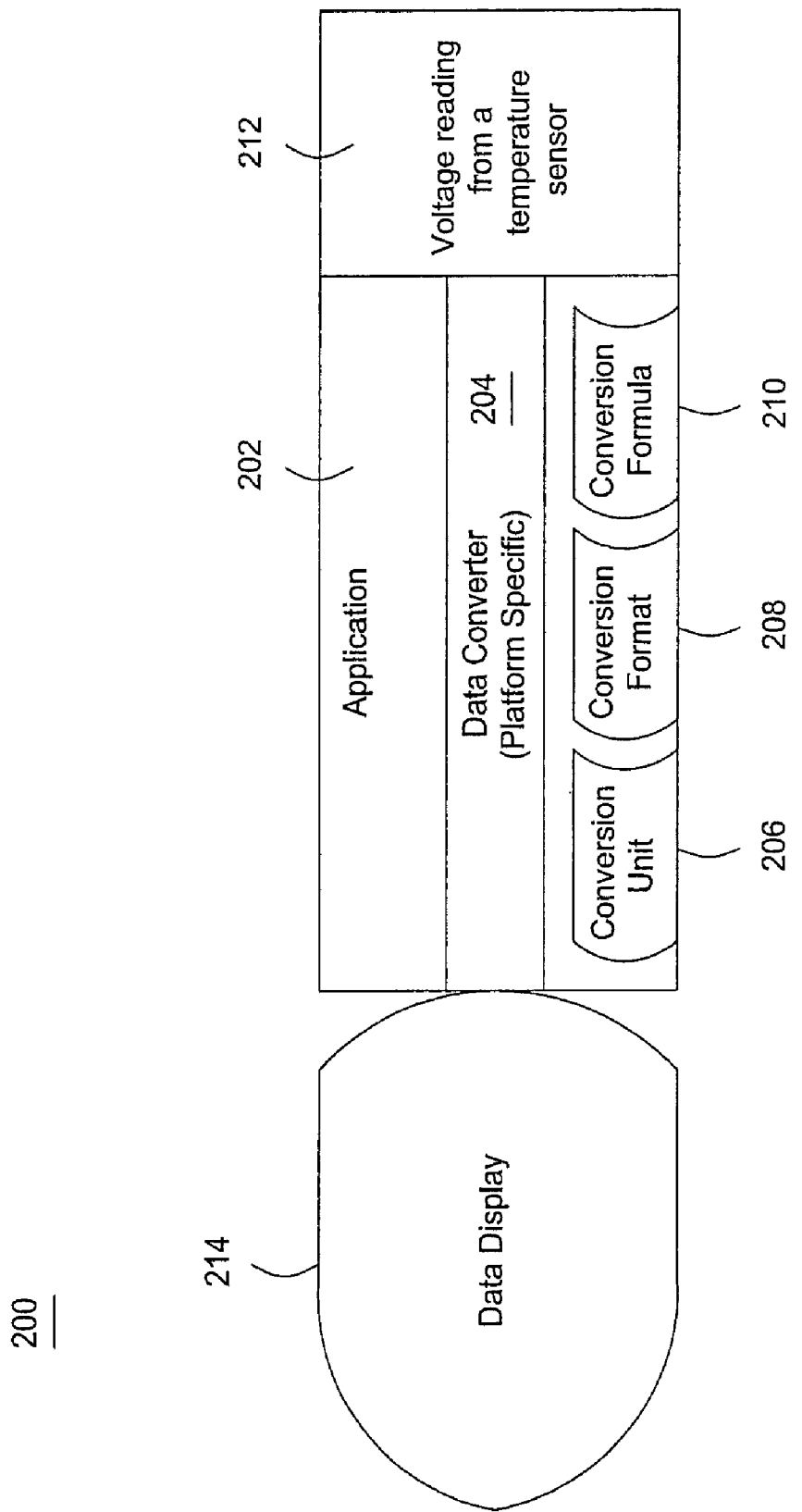
FIG. 2 is an illustration of a prior art system.

FIG. 2 is an illustration of a prior art system 200. The system 200 includes application software 202 that includes a data converter module 204. The data converter module is platform specific, such as to a scan tool 100 so that only conversion formulas for that scan tool are available for use. The data converter module 204 includes a conversion unit module 206, a conversion format module 208 and conversion formula module 210. The data converter module is part of the application software for the platform. The conversion unit module 206 converts the data from one unit to another if needed, for example, converting Celsius to Fahrenheit for temperature or from meters to millimeters for distance measurements and other units. The data converter module also includes a conversion format module 208 that translates the conversion to the correct format, such as the protocol for transmission that is issued by the platform. The data converter module includes the conversion formulas that will be needed for the platform.

A raw data, for example, can be voltage reading from a temperature sensor 312 (FIG. 3) in the vehicle can be received. The data can be in any type of format due to variations in make and models of vehicles. Once the raw data is received, the data has to be converted by the data converter to the right format using the conversion formula. However, if the conversion format, conversion unit or the conversion formula is incorrect, the entire data converter portion of the application code will have to be replaced or updated. As stated above, when the application has to be updated, it can be costly to the manufacturer of the scan tool because the manufacturer has to guarantee that its database that it sold in the scan tool is correct. Thus, an update has to be sent out in the form of a CD, compact flash card or other computer readable medium so that the scan tool owner can update the database with the correct data converter. Alternatively, the scan tool has to be sent back to the manufacture for the update and this can be costly not only to the scan tool manufacturer but to the scan tool owner for the down time due to the update.

Figure 3:
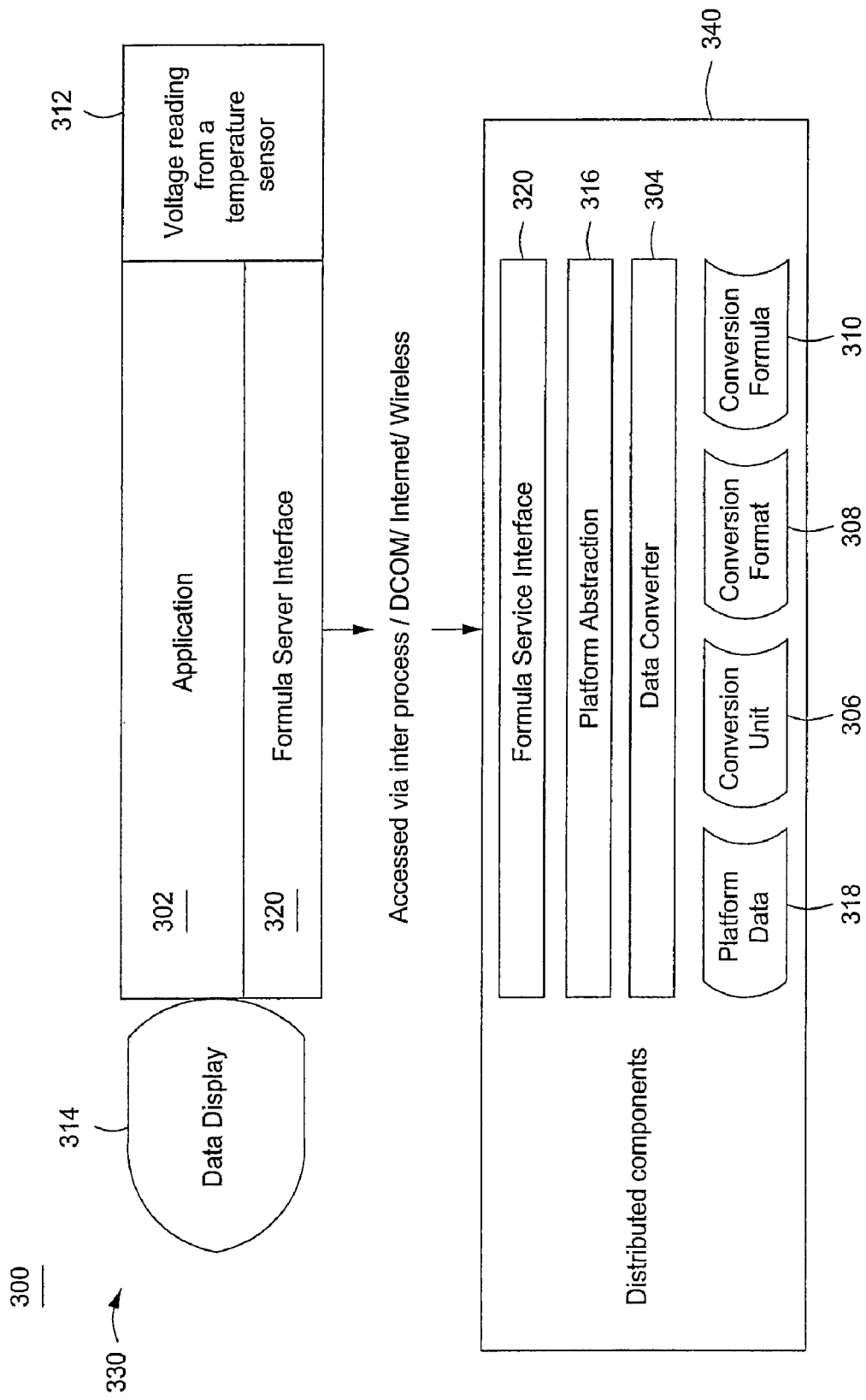
FIG. 3 illustrates a formula server system according to an embodiment of the invention.

FIG. 3 illustrates a formula server system 300 according to an embodiment of the invention. The formula server system 300 includes a formula server 340 or a computing device, such as a personal computer, or a server, a networked server such as a distributed server (internet) or any other computing device. The formula server can be a stand alone computer or a connected computer. The connection can be wireless, wired or both.

An example of formula server 340, but not limited by this example, can read computer readable media that includes computer-executable instructions of the present invention. The formula server includes a processor that controls the computer. The processor uses the system memory and a computer readable memory device that includes certain computer readable recording media. A system bus connects the processor to a network interface, modem or other interface that accommodates a connection to another computer or network such as the Internet. As stated above, the connection can be wired or wireless. The system bus also connects the other components of the formula server together. The components include the processor, the system memory, an input and output device, a display and other components.

The formula system 300 includes a platform 330 and the formula server 340. The platform 330 can be any platform such as diagnostic tool 100 described in FIG. 1. The platform 330 includes the application software 302 and a formula server interface 320. Data that requires conversion can be a voltage reading from a temperature sensor 312. The application software allows for the platform to perform its function, such as diagnostic functions. The formula server interface can be the connector interface 112 of tool 100 that allows the platform 330 to communicate through a wired or wireless connection. The wired connection can be direct to the formula server 340 or through a hub, router or other systems, including the internet. The wireless connection can be through any wireless system including Wi-Fi (802.11), infrared, LAN, WLAN, cellular, satellite, Bluetooth or any other wireless systems.

The formula server 340 includes the formula server interface 320 and platform abstraction 316. The formula server can be used with any platform that requires conversion of data using a formula such as a scan tool, battery tester, battery charger, torque angle meter and other diagnostic tools. Other platforms can include medical devices such as MRI, EKG, blood flow monitors, and other devices. The formula server 340 contains a collection of formula abstractions in order for the server to serve various platforms and their respective formulas at one location.

The formula server 340 can be used for current formulas or any formulas that are new. New formulas may be created due to new vehicles specifications, new diagnostic techniques or for other reasons. The formula server is constructed and arranged to be adapted for any platform and its respective formulas that are used with that platform.

The platform abstraction 316 includes the data converter 304 that is needed in order for the platform to convert platform data for its final use by the user. The platform abstraction can direct which formula to use by the data converter based on the data received from a platform. The data converter 304 takes a platform data 318 and converts it using a conversion unit module 306, the conversion format module 308 and the conversion formula module 310. The conversion unit module converts the platform data to the desired unit. The conversion format module converts the platform data to the correct format desired by the user for that platform. The conversion formula converts the platform data to the desired information of the user. Once the conversion is completed, the desired information can be transmitted to the platform 330 for display on the display 314. The transmission of the desired information can be accomplished using the wired and wireless method described above.

By having the server, the formulas can be stored at a location remote from the platform so that the server can be used to support various platforms and their respective diagnostic applications. The diagnostic data can be used on various platforms since the conversion of the data and the display can be done by the server and transmitted to the various platforms. For example, the diagnostic data can be converted and displayed on diagnostic tools made by various manufacturers, on personal computers running windows, Linux or Apple's OS X. Any defects in the formula can be instantly and cost effectively updated at one location, the server. Additionally, verification and testing of the formula can be done in the field without requiring a software build and thus, decrease testing time.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer).

Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer that converts data, comprising:
    a processor to process information and operate the computer;
    a memory of the computer storing software and communicating with the processor; and
    a communication interface that allows the computer to communicate with a remote diagnostic device, wherein the software includes a platform abstraction module and a data converter module, the platform abstraction module directs which formula the data converter module uses to convert a data received from the remote diagnostic device based on the platform abstraction module's determination of the data's platform.

2. The computer of claim 1, wherein the data converter module further comprises a conversion unit module and a conversion format module.

3. The computer of claim 1, wherein the formula is stored in a conversion formula module of the data converter module.

4. The computer of claim 1, wherein the communication interface communicates with the remote diagnostic device via a wired or wireless connection.

5. The computer of claim 1, wherein the remote diagnostic device is a medical diagnostic device.

6. The computer of claim 1, wherein the data converter module further comprises a conversion unit module, a conversion formula module, and a conversion format module.

7. The computer of claim 1, wherein multiple diagnostic applications of various remote diagnostic devices have their respective data converted by one computer.

8. The computer of claim 1, further comprising an input device for inputting information, wherein the remote diagnostic device is a vehicle scan tool.

9. A method of converting data using a computer, comprising the steps of:
    receiving platform specific data from a diagnostic device by a processor of the computer;
    converting the data with the processor of the computer using a conversion formula from a data converter module, the conversion formula is chosen at the direction of a platform module based on the platform module's determination of the data's platform; and
    transmitting the converted data to the diagnostic device using a communication interface.

10. The method of claim 9, wherein the data converter module and the platform's module are stored on a memory coupled to the processor.

11. The method of claim 9, wherein the transmitting is done via a wired or wireless connection.

12. The method of claim 9, wherein converting data further include converting the data's unit with a conversion unit module and the data's format using a conversion format module.

13. The method of claim 9, wherein the diagnostic device is a scan tool for a vehicle.

14. The method of claim 9, further comprising converting from one data format to a different data format in order to transmit the converted data to a different formatted diagnostic device.

15. The method of claim 9, wherein the diagnostic device is medical diagnostic device.

16. A computer that converts data, comprising:

means for processing information and operating the computer;

means for storing a software, the means for storing communicating with the means for processing; and means for communicating with a remote diagnostic device, wherein the software includes a platform abstraction module and a data converter module, the platform abstraction module directs which formula the data converter module uses to convert a data received from the remote diagnostic device based on the platform abstraction module's determination of the data's platform.

17. The system of claim 16, wherein the data converter module further comprises a conversion unit module and a conversion format module.

18. The system of claim 16, wherein the formula is stored in a conversion formula module of the data converter module.

19. The system of claim 16, wherein the means for communicating communicates with the remote diagnostic device via a wired or wireless connection.

20. The system of claim 15, wherein the computer converts the data into a format that is different from the data received from the remote diagnostic device so that the converted data is displayed on a different device.

* * * * *